United States Patent
Kimiabeigi

(10) Patent No.: US 8,618,710 B2
(45) Date of Patent: Dec. 31, 2013

(54) WEDGE FOR A STATOR OF A GENERATOR WITH PREFORMED COIL WINDINGS

(75) Inventor: Mohammad Kimiabeigi, Sheffield (GB)

(73) Assignee: Siemens Aktiengesellschaft, Munich (DE)

( * ) Notice: Subject to any disclaimer, the term of this patent is extended or adjusted under 35 U.S.C. 154(b) by 160 days.

(21) Appl. No.: 13/293,175

(22) Filed: Nov. 10, 2011

(65) Prior Publication Data

US 2012/0133237 A1    May 31, 2012

(30) Foreign Application Priority Data

Nov. 26, 2010  (EP) .................................... 10192754

(51) Int. Cl.
*H02K 3/48* (2006.01)
(52) U.S. Cl.
USPC .......................................... 310/214; 310/215
(58) Field of Classification Search
USPC ................................................ 310/214–215
See application file for complete search history.

(56) References Cited

U.S. PATENT DOCUMENTS

| | | | |
|---|---|---|---|
| 2,015,554 A | 9/1935 | Fisher | |
| 2,990,487 A | 6/1961 | Stigler et al. | |
| 3,641,378 A | 2/1972 | LeHenaff | |
| 5,053,663 A * | 10/1991 | Boer et al. | 310/91 |
| 5,239,220 A * | 8/1993 | Taji et al. | 310/214 |
| 5,252,877 A * | 10/1993 | Sawa et al. | 310/214 |
| 5,258,681 A * | 11/1993 | Hibino et al. | 310/214 |
| 5,365,135 A * | 11/1994 | Konrad et al. | 310/214 |
| 2002/0067082 A1* | 6/2002 | Hatley et al. | 310/42 |

FOREIGN PATENT DOCUMENTS

| | | |
|---|---|---|
| GB | 619058 A | 3/1949 |
| JP | 58028550 A | 2/1983 |

* cited by examiner

*Primary Examiner* — Thanh Lam

(57) ABSTRACT

A wedge for a stator of a generator with preformed coil windings includes a retaining portion for retaining coil windings. The retaining portion covers at least part of two neighbouring stator slots. A mounting projection at a bottom surface of the retaining portion for mounting the wedge to a top surface of a stator tooth is located between the two neighbouring stator slots.

7 Claims, 2 Drawing Sheets

WEDGE FOR A STATOR OF A GENERATOR WITH PREFORMED COIL WINDINGS

CROSS REFERENCE TO RELATED APPLICATIONS

This application claims priority of European Patent Office Application No. 10192754.9 EP filed Nov. 26, 2010, which is incorporated by reference herein in its entirety.

FIELD OF INVENTION

The invention is directed to a wedge for a stator of a generator with preformed coil windings. The invention further relates to a stator and a generator.

BACKGROUND OF INVENTION

In a typical stator of a generator with preformed coil windings, a wedge is used to keep the coils fixed inside their respective stator slots. In wind power applications, preformed coils are preferred to other alternatives due to their high reliability. Because of their solid preformed structure, these coils need to be inserted radially into the slots.

Therefore, the slots need to be completely open near the air gap. The wedge can be made of magnetic or non-magnetic material, while the non-magnetic wedge is preferred due to a higher reliability.

To insert the wedge above the coils and close the open slots, the stator laminations have recesses inside the stator slots near the slot opening. It can be theoretically shown that these openings, in case of a non-magnetic wedge, increase the cogging and ripple torque due to magnetic saturation of the narrow corners of the stator teeth. Furthermore, in case the non-magnetic wedge is used, the wedge material has a low thermal conductivity and thereby insulates the winding from the airflow in the air gap and decreases the cooling efficiency of the generator. Finally, in case of non-magnetic wedge, the ripple and cogging torque can be significantly large which requires some ripple torque minimization techniques like shaping the permanent magnets in a permanent magnet generator.

SUMMARY OF INVENTION

It is an object of the claimed invention to improve the attachment of preformed coil windings in a generator. This object is solved with the features of the independent claims.

A wedge for a stator of a generator with preformed coil windings comprises a retaining portion for retaining coil windings, wherein the retaining portion covers at least part of two neighbouring stator slots, and a mounting projection at a bottom surface of the retaining portion for mounting the wedge to a top surface of a stator tooth located between the two neighbouring stator slots. The wedge is attached to a top or radial surface of the stator which allows more freedom in the mechanical and electro-magnetic design of the wedge. Furthermore, the cooling of the generator may be enhanced for forced air cooling generators. The ease of the insertion of the preformed coils into the open stator slots is combined with an easy to mount wedge. Only one pair of projection/recess is necessary to mount the wedge and therewith attach the coils in an easy and secure fashion.

The retaining portion may cover half of each of the two neighbouring stator slots. This size of the retaining portion allows easy handling and secure attachment of the coils. It is also possible to implement a broader retaining portion which covers the complete width of each of the two neighbouring stator slots so that the number of wedges is significantly reduced.

The wedge may comprise ferromagnetic material. The proposed wedge is a better alternative than a conventional non-magnetic wedge and also than a conventional magnetic wedge. It keeps the ease of the insertion of the preformed coils into the open slots, while removing the disadvantage of having magnetically open slots by adding a magnetic wedge. This decreases the cogging and ripple torque. Further, the edge's or corner's shape of the wedge can be flexibly designed to minimize the vibration and noise, more easily and more effectively compared to a conventional magnetic wedge. Furthermore, for air cooled generators, the coolant air is blown through the air gap and above the stator teeth and wedge. In case of conventional non magnetic wedge, the wedge thermally insulates the underlying coil from the coolant air and thereby reduces the cooling efficiency. Here, the windings are cooled efficiently.

The wedge may be laminated to limit the eddy currents in the wedge. It is further possible to glue the laminations together to form a solid structure. The thickness of the laminations can preferably be the same as stator laminations.

The wedge may comprise several sections in a longitudinal direction, wherein the sections are spaced apart from each other by a spacer to insulate them from each other by the provided air gap distance. This can be done as an alternative to surface treatment of the face sides of the sections or lamination parts. The spacer can be integrally formed with the wedge section, for example as part of a face side.

Edges of the retaining portion may comprise a structure optimized for electromagnetic fields. The cogging and ripple torque and thereby noise and fatigue can be minimized using an optimal shape of the edges or corners of the wedge.

The retaining portion may have a curved upper surface. The curved upper or radial surface can be adapted to the surface of the stator to enhance running smoothness.

In a second aspect, the claimed invention is directed to a stator of a generator with preformed coil windings, comprising stator slots and stator teeth, wherein one stator tooth is arranged between two neighbouring stator slots and a wedge as described above. The stator has the same advantages and modifications as the previously described wedge.

A recess may be provided in a top surface of a stator tooth. The recess in a top or radial surface can be manufactured easily. Further, only one recess per wedge is necessary.

The stator and the wedge may comprise the same ferromagnetic material. This decreases the cogging and ripple torque and thereby noise and fatigue can be minimized.

The stator and the wedge may comprise the same laminated structure. This limits eddy currents in the stator and the wedge effectively.

In a further aspect, the claimed invention is directed to a generator with preformed coil windings comprising a stator as described above. The generator has the same advantages and modifications as the previously described stator and/or wedge.

The accompanying drawings are included to provide a further understanding of embodiments. Other embodiments and many of the intended advantages will be readily appreciated as they become better understood by reference to the following detailed description. The elements of the drawings do not necessarily scale to each other. Like reference numbers designate corresponding similar parts.

DETAILED DESCRIPTION OF INVENTION

In the following detailed description, reference is made to the accompanying drawings which form a part hereof and in which are shown by way of illustration specific embodiments in which the invention may be practised. In this regard, directional terminology, such as "top" or "bottom" etc. is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
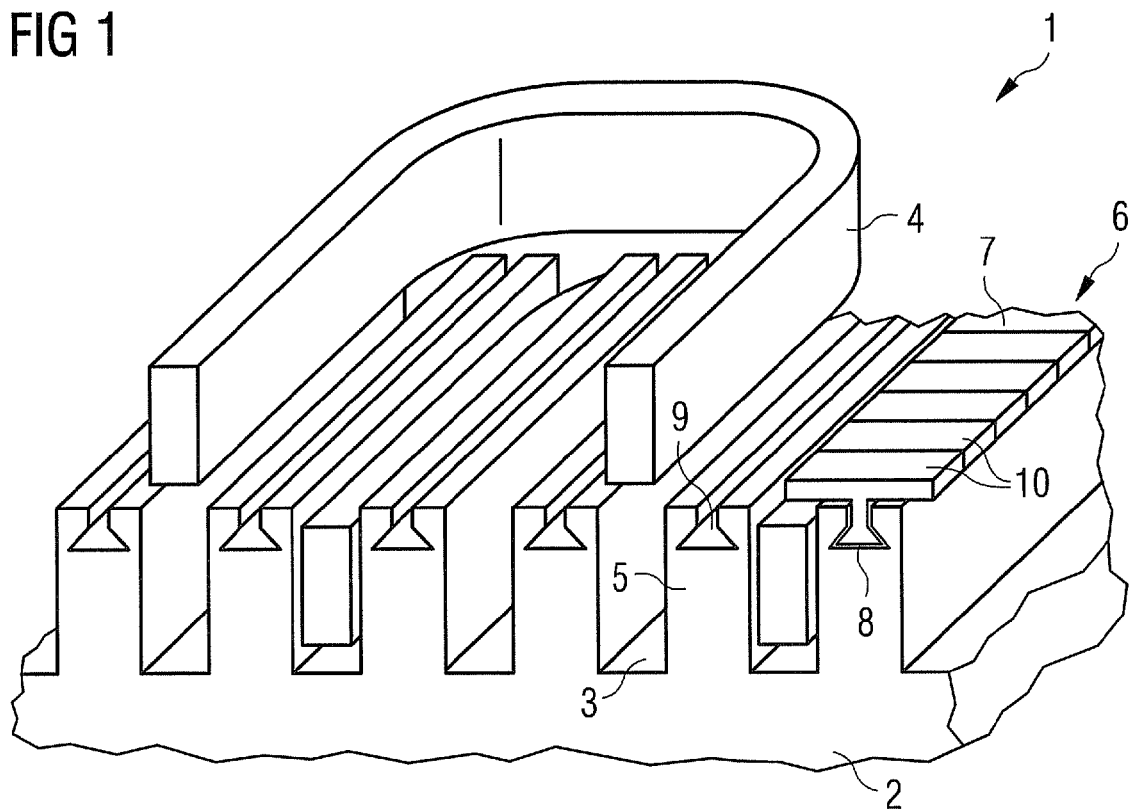
FIG. 1 illustrates a schematic perspective view of a wedge and part of the stator according to the invention.

FIG. 1 shows a part of a generator 1 with a stator 2. The stator 2 has a cylindrical shape. The diameter depends of the application of the generator 1 and can reach several meters for example for a wind turbine application. Stator slots 3 are arranged at an outer or radial surface of the stator 2. The stator slots 3 extend in an axial direction. The stator slots 3 accommodate preformed windings 4. Between two neighbouring stator slots 3 a stator tooth 5 is arranged. The stator tooth 5 defines side walls of the openings of the neighbouring stator slots 3. Hence, stator slots 3 and stator teeth 5 are arranged alternately.

A wedge 6 is attached to the stator 2 in order to retain the windings 4 inside the stator slots 3. The wedge 6 comprises a retaining portion 7, a length of which extends in axial direction. A width of the retaining portion 7 is such that it covers half of each of the two neighbouring stator slots 3.

For the sake of simplicity only one wedge 6 is shown. Two wedges 6 located next to each other cover the intermediate stator slot 3 completely. The two wedges 6 can either fit closely or leave a gap in between. The retaining portions 7 should project far enough into the stator slots 3 to secure the windings 4 inside the slots 3.

At a bottom or radial inner side of the retaining portion 7 a mounting projection 8 is arranged and extends in axial direction. The mounting projection 8 is utilized for mounting the wedge 6 to a top or radial surface of a stator tooth 5. There, a corresponding recess 9 is provided. During fabrication of the stator 2 the recesses 9 can for example be punched out. The mounting projection 8 and the recess 9 form a so called dovetail connection. In this configuration the mounting projection 8 has an upper bar running in radial direction and a lower triangular portion. The recess 9 has the same form so that the mounting projection 8 fits into it. This connection allows mounting of the wedge 6 in axial direction but prevents displacement of the wedge 6 in radial direction. Other suitable connections fulfilling these requirements can be used as well.

The wedge 6 and also the stator 2 consist of magnetic material preferably ferromagnetic material. This allows good electro-magnetic and mechanical characteristics. The wedge 6 and also the stator 2 are laminated to limit eddy currents inside the material. Thin slices or sections 10 of the wedge 6 and the stator 2 respectively are put together to form the wedge 6 and the stator 2 respectively. Face sides of the slices or sections 10 have their surfaces treated to insulate electrically two neighbouring slices or sections 10. To enhance stability the slides or sections 10 are glued together.

In the following the assembly of the stator 2 is described. First, the preformed windings 4 are inserted into the stator slots 3. This is done in radial direction. Then the wedges 6 are inserted into the recesses 9 in an axial fashion. Finally a VPI process (Vacuum Pressure Impregnation) may be done in which gaps between the wedge 6 and the recesses 9 provided in the stator teeth 5 will be filled up by resin and the wedge 6 will be stiffened in its place.

During operation of the generator 1 the material and arrangement of the wedges 6 optimizes the electro-magnetic properties of the generator 1 and thereby reduces vibration and noise. For air cooled generators, the coolant air is blown through the air gap and above the stator teeth 5 and wedge 6 so that the windings 4 are cooled efficiently.

Figure 2:
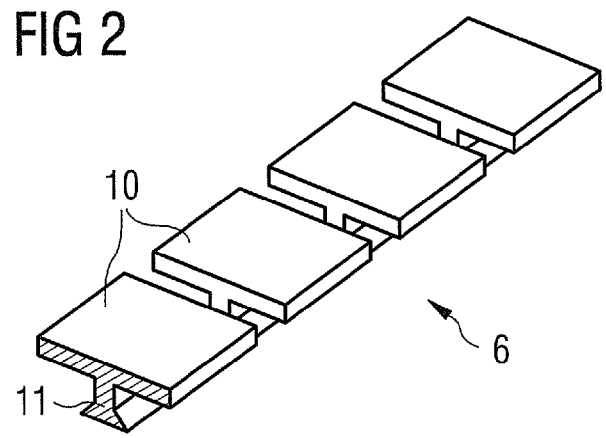
FIG. 2 illustrates a schematic perspective view of a wedge according to the invention.

FIG. 2 shows a wedge 6 prior to assembly. The sections 10 of the wedge 6 are not connected yet. A face side 11 is covered with electrically insulating material or film as indicated by the hatching of the face side 11. In the next step the sections 10 are glued together to form a solid wedge 6. The actual thickness of a section 10 may be much smaller than depicted.

Figure 3:
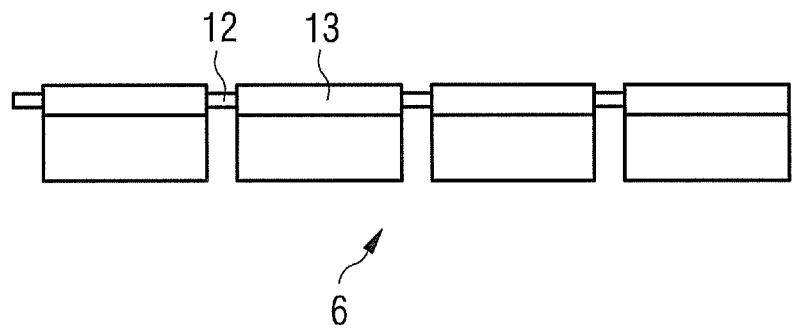
FIG. 3 illustrates a schematic side view of a wedge according to the invention.

FIG. 3 shows another implementation of the electrical insulation of the single sections 10 of the wedge 6. Here, a spacer 12 is provided between the wedge laminations or sections 10 to insulate them from each other by the provided air gap distance. This can be used as an alternative to surface treatment. The spacer 12 can be a convex part of the face side 11 of the section 10.

Figure 4:
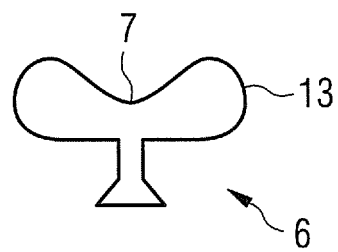
FIG. 4 illustrates a front view of a wedge according to the invention.

FIG. 4 shows an implementation of the wedge 6 which minimizes ripple and cogging torque and thereby noise and fatigue. This is achieved by particularly formed edges and/or corners of the retaining portion 7. They comprise structures 13 which are optimized for electro-magnetic fields. The arrangement of the wedge 6 on a top surface of the stator tooth 5 gives ample freedom to design an optimal shape of the wedge 6.

Figure 5:
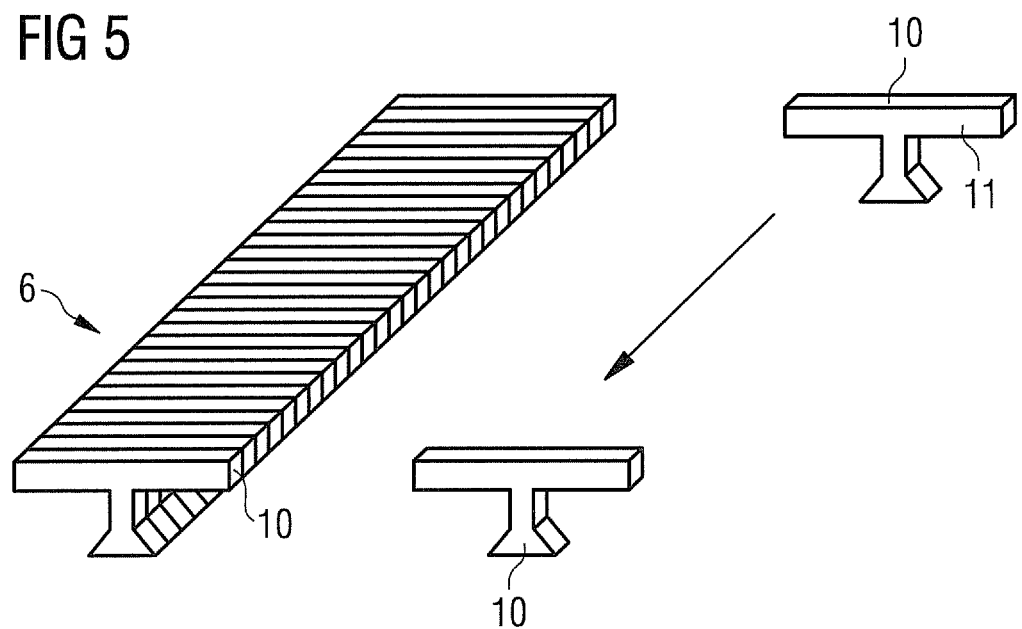
FIG. 5 illustrates a schematic perspective view of a wedge according to the invention.

FIG. 5 a further implementation of the wedge 6. Here, the wedge 6 is composed of thin laminations 10 which are glued together to provide more strength. The laminations 10 can comprise the same material and/or the same thickness as the rest of the stator 2. The single laminations 10 can be insulated from neighbouring laminations 10 by the glue or by surface treatment.

The wedge 6 is formed as shown in the right diagram of FIG. 6. Glue is applied to a face side 11 of a lamination 10. Then, the lamination 10 is moved in direction of the arrow onto a face side of another lamination 10. The glue keeps the two laminations 10 together. This procedure is repeated until the desired length of the wedge 6 is achieved. Of course, glue can applied to both face sides 11 of the laminations 10.

The invention claimed is:

1. A stator of a generator with preformed coil windings, comprising:
   stator slots and stator teeth, wherein one stator tooth is arranged between two neighbouring stator slots, and
   a wedge, the wedge comprising:
      a retaining portion for retaining coil windings, wherein the retaining portion covers at least part of two neighbouring stator slots, and
      a mounting projection at a bottom surface of the retaining portion located between the two neighbouring stator slots for mounting the wedge to a top surface of a stator tooth located between the two neighbouring stator slots,
wherein the wedge is laminated,
wherein the wedge and the stator comprise the same ferromagnetic material,
wherein the wedge and the stator comprise the same laminated structure, and
wherein the thickness of the laminations of the wedge is the same as the stator laminations.

2. The stator according to claim 1, wherein the retaining portion wherein the retaining portion covers half of each of the two neighbouring stator slots.

3. The stator according to claim 1, further comprising:
a plurality of sections in a longitudinal direction, wherein the sections are spaced apart from each other by a spacer.

4. The stator according to claim 1,
wherein edges of the retaining portion comprise a structure optimized for electromagnetic fields.

5. The stator according to claim 1,
wherein the retaining portion has a curved upper surface.

6. The stator of a generator according to claim 1,
wherein a recess is provided in a top surface of a stator tooth.

7. The stator according to claim 1,
wherein the laminations of the wedge are glued together.

* * * * *